UNITED STATES PATENT OFFICE 2,370,011

STABILIZED ALDOL-ALPHA-NAPHTHYLAMINE

Earle H. Comstock, Norwalk, Conn., assignor to R. T. Vanderbilt Company, Inc., New York, N. Y., a corporation of New York No Drawing. Application October 16, 1943, Serial No. 506,557

2 Claims. (Cl. 260—21)

Aldol-alpha-naphthylamine is a resinous solid at ordinary temperatures. At a temperature of 70°–80° C. the pulverized material flows together to form a solid mass within a very short period; at ordinary temperature the material gradually flows together to form a solid mass.

In an application filed September 27, 1943, Serial No. 504,055, Albert A. Somerville has described the use of substantial proportions, about 10%–20% by weight on the rubber, of aldol-alpha-naphthylamine in GR-S (Government Rubber-Styrene) rubber compounds (butadiene-styrene copolymer-type rubber) to impart to the compound the property of reversion. The handling and dispersion of the material in such proportions is difficult because of its resinous properties.

I have now discovered that pulverent aldol-alpha-naphthylamine remains pulverulent even over long periods at 70°–80° C. if a minor proportion of zinc stearate is thoroughly mixed with it. Specifically, I have found that a pulverulent mixture of aldol-alpha-naphthylamine and zinc stearate containing a major proportion of aldol-alpha-naphthylamine and about 5%–10% by weight on the mixture of zinc stearate remains pulverulent indefinitely at 25° C. and for periods upwards of 48 hours at 70° C.

This composition is conveniently produced by grinding the aldol-alpha-naphthylamine, mixing the zinc stearate with the ground material and regrinding the mixture. The mixture may, for example, be ground 90% to pass a 40 mesh screen. A minimum proportion of about 5% of zinc stearate appears desirable; zinc stearate in excess of about 10% does not appear to be particularly useful. The pulverulent composition is a soft, dry powder.

This composition of my invention, a pulverulent mixture of aldol-alpha-naphthylamine and zinc stearate containing a major proportion of aldol-alpha-naphthylamine and about 5%–10% of zinc stearate, has a number of important advantages, particularly in GR-S rubber compounds such as those described in application Serial No. 504,055 previously mentioned. It is easy to handle. It has little tendency to dust or scatter during incorporation on a compounding mill. It is easily incorporated and dispersed in GR-S rubber compounds. It retains these properties at temperatures as high as 70°–80° C. Its use in GR-S rubber compounds adds nothing incompatible to the compound and adds only a very small proportion of the zinc stearate.

Zinc stearate exhibits the same properties in compositions in which the resinous component is a combination of aldol-alpha-naphthylamine and rosin, for example a combination of three parts by weight of aldol-alpha-naphthylamine and one part of rosin. My invention includes compositions comprising a major proportion of aldol-alpha-naphthylamine, rosin and about 5%–10% of zinc stearate.

I claim:

1. A pulverulent mixture of aldol-alpha-naphthylamine and zinc stearate containing a major proportion of aldol-alpha-naphthylamine and about 5%–10% of zinc stearate.

2. A pulverulent mixture of aldol-alpha-naphthylamine, rosin and zinc stearate containing a major proportion of aldol-alpha-naphthylamine and about 5%–10% of zinc stearate.

EARLE H. COMSTOCK.